United States Patent [19]

Levy

[11] Patent Number: 4,958,465

[45] Date of Patent: * Sep. 25, 1990

[54] COMBINED ABOVE AND BELOW GRADE DWELLING WITH MARINE HABITAT

[76] Inventor: Jacques S. Levy, 1015 33rd St., NW., Washington, D.C. 20007

[*] Notice: The portion of the term of this patent subsequent to Jun. 13, 2006 has been disclaimed.

[21] Appl. No.: 413,128

[22] Filed: Sep. 27, 1989

[51] Int. Cl.$^5$ .................. E02D 27/00; B63B 35/00
[52] U.S. Cl. .................................. 52/169.1; 52/236.2
[58] Field of Search .................. 52/236.2, 234, 169.1, 52/169.7, 169.3

[56] References Cited

U.S. PATENT DOCUMENTS 4,837,989 6/1989 Levy ............................ 52/236.2

Primary Examiner—James L. Ridgill, Jr.
Attorney, Agent, or Firm—Richard C. Litman

[57] ABSTRACT

A building installation includes a multi-level development with several stacked levels each offering a plurality of adjacent units suitable as individual offices, residential or the like units. Certain of the lowermost levels may be constructed below or at grade, and if below garde, then witin an excavation that extends immediately adjacent the lowermost levels and includes a containment for water and adapted to provide a habitat for marine life. Windows in the wall of at least one of the levels juxtaposed the water containment permit direct observation of the marine life while walkways and stairways exteriorly of both sides of the building levels allows ready movement of installation residents both betwen all levels and ground level. The water containment may include a centrally disposed island with one or more cross-overs so residents may pass from one or more building levels, over the water, to the island and enter the water therefrom.

3 Claims, 1 Drawing Sheet

COMBINED ABOVE AND BELOW GRADE DWELLING WITH MARINE HABITAT

FIELD OF THE INVENTION

This invention relates generally, to the construction of buildings, and more particularly, to an improved combination of multi-unit living or other areas in conjunction with a relatively large body of contained water adapted to provide a habitat for marine life.

BACKGROUND OF THE INVENTION

The present invention is an improvement over that as disclosed in my earlier U.S. Pat. No. 4,837,989 issued on June 13, 1989.

The popularity of observatories or aquariums for the display of living aquatic animals is well recognized. Numerous facilities have been constructed to provide a public display of marine life such as the open-air, tank installations in the state of Florida and the various enclosed aquariums. Many such facilities often operate under standing-room-only conditions.

Submerged off-shore facilities have been provided, to allow visitors to observe marine life, both as contained in tanks therein, as well as in the surrounding sea water. An example of such an installation will be found in U.S. Pat. No. 4,186,532 issued Feb. 5, 1980 to Kahn. Another example of an off-shore facility is shown in British Pat. No. 23,335 dated Oct. 3, 1913. In both of the above examples, visitors use a stairway to pass between connected, above-water and below-water observation levels.

The present invention offers an improvement over the above mentioned public facilities and wherein, an on-shore building construction is provided, having a plurality of separate living or other type of units, arranged in a unique manner in combination with an adjacent containment of water whereby, residents or users are provided with the ultimate in close association with marine life residing therein.

SUMMARY OF THE INVENTION

Accordingly, it is an object of the present invention to provide an improved installation offering a dwelling combined with a marine habitat including an on-shore multi-family housing unit or other type multi-room installation provided with an immediately adjacent water containment having resident aquatic animals allowing users to freely move between the various units and to have direct access to the water housing the marine life.

Another object of the present invention is to provide an improved combined dwelling with marine habitat including a substantially circular residential, office or recreational building having a plurality of separate units disposed on multiple horizontal or vertical levels, with an adjacent, concentrically disposed containment of water provided with resident marine life.

A further object of the present invention is to provide an improved combined dwelling with marine habitat including a building having a plurality of separate living quarters or other units located on multiple vertical or horizontal levels adjacent a containment of water having marine life therein and wherein at least one building level is disposed below ground level.

Still another object of the present invention is to provide an improved combined dwelling with marine habitat including a ring or otherwise shaped building unit having multi-levels each containing a plurality of individual living quarters or rooms, some above and others below grade and with an adjacent, body of water provided with aquatic animals.

Another object of the present invention is to provide an improved combined dwelling with marine habitat including a circular, oval or otherwise configured multi-level housing structure wherein certain levels are disposed below ground level with a juxtaposed body of water and wherein access is provided to individual family units on both sides of the circular structure.

Still another object of the present invention is to provide an improved combined dwelling with marine habitat including a ring-like residential housing structure surrounding a containment of water with resident marine life therein and wherein a centralmost island may be provided within the contained water and accessible from the inner side of the housing structure.

Another object of the present invention is to provide an improved dwelling installation combined with a marine habitat including a housing structure having a plurality of units on multiple levels and wherein a water containment housing marine life is immediately juxtaposed at least one such level, with direct visual and body access to the water being provided to users of the installation.

With these and other objects in view which will more readily appear as the nature of the invention is better understood, the invention consists in the novel construction, combination and arrangement of parts hereinafter more fully described, illustrated and claimed, with reference being made to the attached drawing.

BRIEF DESCRIPTION OF THE DRAWING

Similar reference characters designate corresponding parts throughout the several figures of the drawing.

DESCRIPTION OF THE PREFERRED EMBODIMENTS

Figure 1:
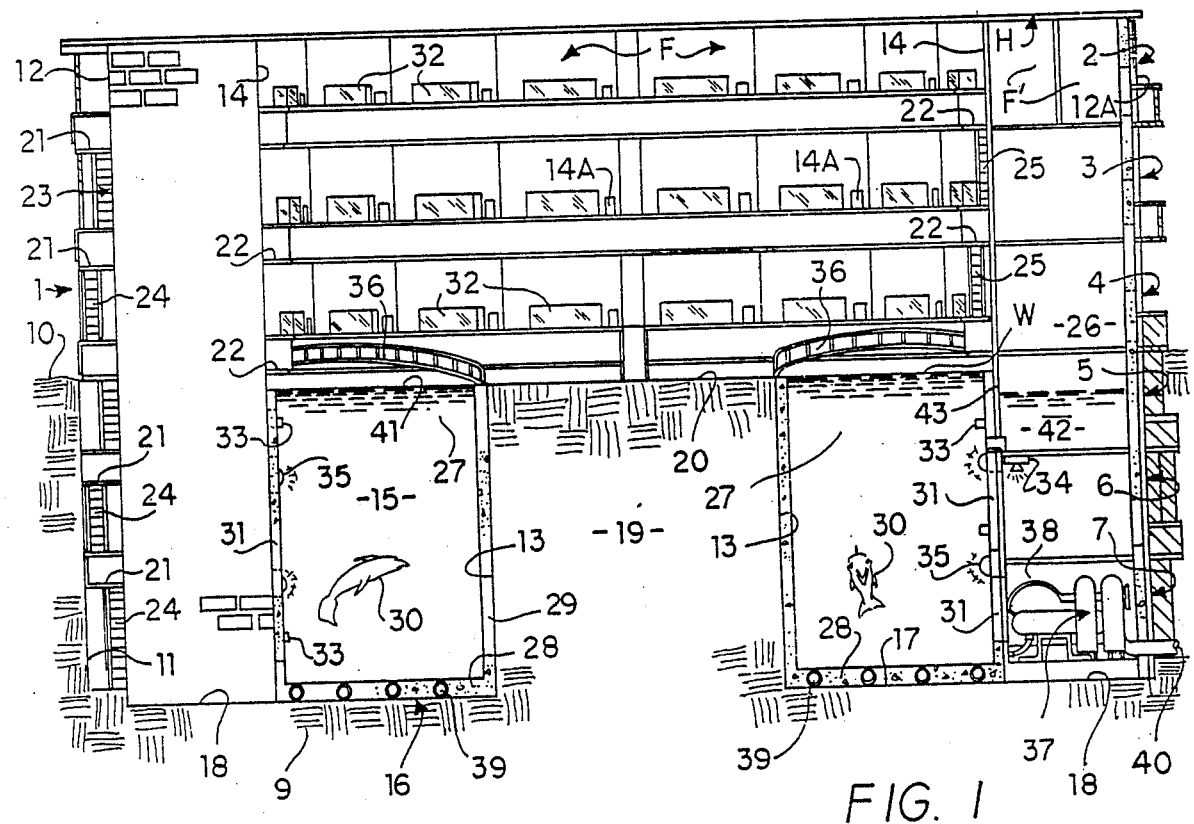
FIG. 1 is a vertical sectional view of a typical installation according to the present invention.
Figure 2:
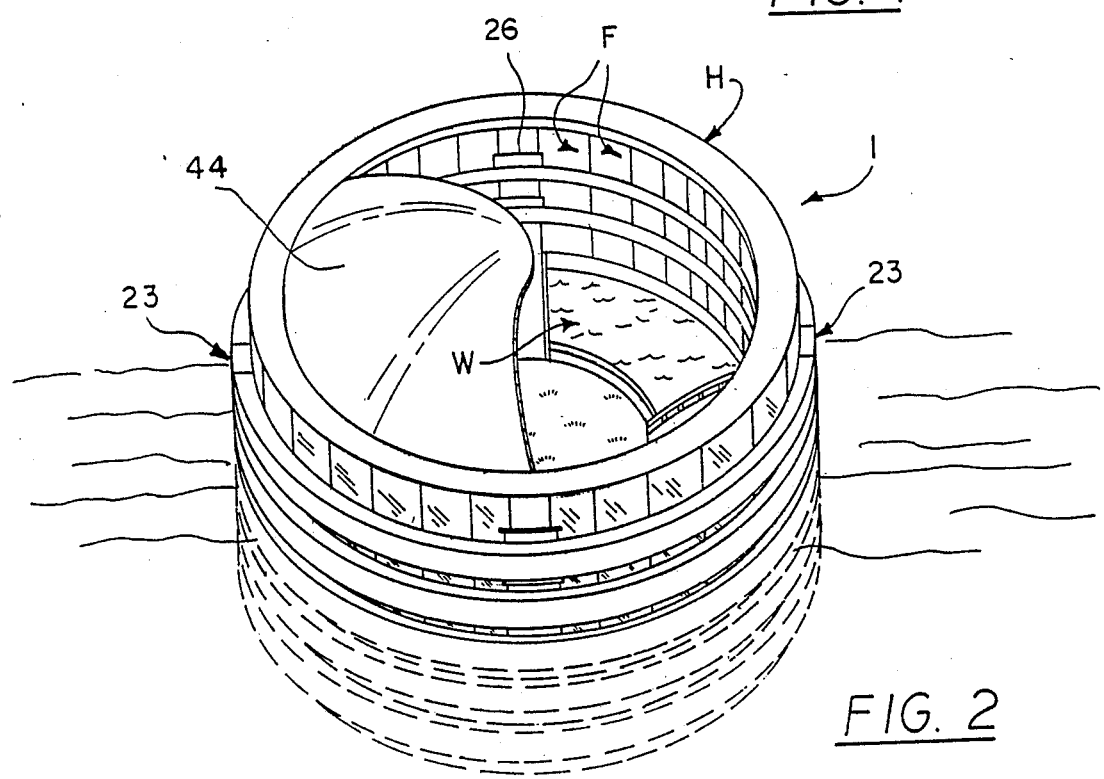
FIG. 2 is a top perspective view of the structure of FIG. 1.

Referring now to the drawing, particularly FIGS. 1 and 2, the present invention will be understood to relate to an on-shore installation 1 providing co-habitation between residents of a multi-unit housing assembly or structure, generally designated H, and an immediately adjacent containment of water, generally referenced as W. The housing structure H comprises a plurality of levels or stories 2-7 preferably forming an endless or continuous arrangement such as a ring or circular shape. Alternatively, other configurations may be employed such as oval or polygonal configurations. The advantages of a closed or continuous configuration will become apparent hereinafter.

As will be seen from the drawings, the housing structure H is erected within an excavation 8 formed within the soil 9. This excavation 8 extends below the grade or ground level 10 a sufficient depth to allow for the erection of one or more of the building levels below grade as reflected in the drawing. FIG. 1 illustrates levels 2,3 and 4 erected above grade while levels 5,6 and 7 are disposed below grade but it will be apparent that an alternate number of stories may be erected above and below ground, respectively. For example, the lowermost level may be constructed directly at grade level.

The excavation 8 is formed with an outer wall 11 adjacent to the external configuration of the housing structure outside wall 12. In the case of a circular structure outside wall 12, the inner wall 13 of the excavation 8 is preferably likewise circular and will be seen to be well spaced inwardly of the building inside wall 14 such that a concentric, relatively enlarged excavated area 15 is provided immediately adjacent the building inside wall 14 and radially extends from this latter wall to the inner wall 13. The floor 16 of the excavation 8 will be seen to comprise a water containment section 17 and the adjacent building section 18. These two sections may be coplanar as shown or alternatively, disposed at two different levels, as will be described.

As an alternative, regardless of the configuration of the housing structure, it will be appreciated that the water containment W may be constructed so as to position it at any one or more other levels, besides those shown in the drawing.

An island 19 may be provided within the confines of the excavation inner wall 13, the latter of which is preferably concentric with the building structure walls 12 and 14, but which may also assume any desired configuration. The top or upper surface 20 of any such island may be disposed at various elevations. As shown in the drawing, this surface 20 is located substantially at the level of grade 10 but may be formed above or, even below grade 10, as desired. Quite obviously, if it is desired to omit the inclusion of the central-most island 19, the excavation 8 would extend, as a coextensive area, between its outer wall 11.

Each housing structure story 2-7 includes a plurality of adjacent, individual units F, each of which may comprise a self-contained family unit or living quarters having any desired number of rooms which may be alternatively configured, or alternatively, office space or recreation rooms, etc. The term family unit is to be construed to refer to any desired residential or office enclosure, suitably configured interiorly as desired. Additionally, each unit F may fully extend between the outside and inside walls 12,14 or may comprise radially adjacent units F',F" such as shown in FIG. 1. In the former instance, each unit F may have access from either building wall 12,14 while in the latter case, each unit F' will be accessed from its respective building wall 12 or 14. In this respect it will be understood that each unit F and F' may include an appropriate door 12a, 14a in the wall 12 or 14.

Each of the building levels may be provided with an external balcony or walkway which may completely encircle the structure H. Thus, it will be seen that balconies or walkways 21 are provided along the outside wall 12 while balconies or walkways 22 are located along the inside wall 14 from the level of the water containment W, upwardly. With this construction, occupants of any unit F or F', by using the appropriate door 12a, 14a, may walk to any angular location of the building structure H. To offer access between various ones of the levels 2-7 as well as with the ground level 10, a plurality of arcuately spaced apart stairway assemblies 23 are provided adjacent the building outside wall 12 with individual flights 24 providing communication between each vertically adjacent building walkway 21. The stairway assemblies may be equi-spaced about the periphery of the building and may comprise any desired number of stairways so as to provide ease of movement by the occupants, between their respective unit F,F' and the adjacent ground level 10. As noted, the excavation outer wall 11 radially extends beyond the building outer wall 12. In this manner, the stairway flights 24 leading to those building levels 5-7 below the ground level 10, are readily accommodated.

A plurality of inside stairways 25 similarly connect the vertically adjacent balconies or walkways 22 on the inside wall 14 of the building structure H that is, with respect to those stories 2-3 located substantially above the level of the island top surface 20. This latter access means or stairways 25 may be radially aligned with the previously described outside stairways 23 and communicate therewith by means of radial passageways 26, each disposed between selected adjacent family units F or F' on those levels 2-3 located above grade level. With the foregoing in mind, it will be seen that occupants of the housing structure H are provided with ready access to and from their respective family unit, and the adjacent ground level 10.

The excavated area 15 between the island 19 and inside building wall 14 is intended to retain water 27 to provide the containment W serving as a habitat for aquatic animals, such as dolphins or porpoises. In instances wherein the island 19 is omitted, the body of water would obviously extend fully within the confines as defined by the building inside wall 14. The outer boundary of this water body will be understood to be provided by an adequately reinforced building inside wall 14, while an appropriate structural base 28 is disposed upon the excavation floor 17 and a vertical wall 29 surrounds the island 19. Quite obviously that portion of the building inside wall 14 located below grade 10 will be constructed of suitable strength to adequately withstand the pressure of the water 27 within the containment W. To enable occupants of the lower levels 5-7 to closely observe the marine life 30 residing in the water 27, at least one window 31 is provided within the inside wall 14 of each family unit F in the lower levels 5-7. With this construction, a most intimate relationship is established between occupants of the units and the marine life 30 juxtaposed the lower stories 5-7. Although occupants of the above grade units in levels 2-4 do not have the benefit of the direct, below water-level communication by way of the windows 31 disposed below water level, they may view the aquatic life from the windows 32 in the inside wall of the upper levels or from the walkways 22 overlooking the water 27. If the water containment W is disposed at say, one of the upper levels 2,3 or 4 then, of course, the special windows 31 necessary for an underwater installation, would be incorporated at the level adjacent the containment.

The close relationship between the occupants and the marine life is further enhanced by the provision of underwater microphones 33 within the confines of the water 27 and which may be mounted upon any of the three surfaces containing the water, such as the inside housing wall 14. The microphones are connected to a speaker 34 located within each living quarters F,F' and regulated by suitable switch/volume means (not shown) so that any occupant may selective listen to the distinctive sounds made by the marine life within the water 27. To enable around the clock appreciation of the marine life, appropriate underwater lighting units 35 are also provided. The structural island wall 24 may be painted or otherwise adorned with any desirable pictorial scenes such as, aquatic plant life, coral etc.

Occupants of the housing structure H may readily utilize the top surface 20 of the island 19, when present, for various recreational purposes such as sun bathing, picnicking etc. and access thereto may be provided by one or more cross-overs or bridges 36 extending from the lowermost one of the inside walkways 22, to the island top surface 20. Preferably, one such bridge 36 is radially aligned with each of the passageways 26 extending through the housing structure. In this manner, users may proceed, say from their automobile parked outside the installation 1, directly through the nearest passageway 26 through the structure H, and over one of the bridges 36 to the island. With such construction, users will be free to swim in the water 27, either from the surface 20 or the walkway 22 located adjacent the containment W. It will be understood that the inclusion of the island is not necessary but may be included as a possible refinement, since the water level 41 may be disposed adjacent any one of the housing structure levels and thereby provide direct access to the water 27. Maintenance of the proper physical and chemical conditions of the water 27 is assured by providing appropriate support equipment 37 within one or more service rooms 38, preferably located in the lowermost level 7. For example, the temperature of the water 27 may be regulated through conduits 39 embedded within the structural base 28 and which may be supplied with temperature-regulated air or liquid as delivered from the equipment 37, the latter of which may be operated by electricity, gas or fuel oil. Other equipment within the service room 38 will be understood to operate to maintain the purity or cleanliness of the water and may include well known devices such as filters and automatic testing devices.

When the installation 1 is constructed in the vicinity of a natural body of sea water, it is proposed that a suitable pipeline 40 will lead from the service room 38 to the nearest point of the sea water. In such cases, the maintenance of the proper salinity in the water 27 may be readily achieved by periodically cycling into the containment W, measured volumes of fresh sea water as drawn through the pipeline 40. The equipment 37 includes a reversible pump so that water may be directed into as well as out of the containment W. This allows maintenance of the water level 41 at the desired point and permits draining and re-supply of the water, The pipeline 40 may be utilized thusly, both as a supply pipe as well as a drain line.

Should any servicing of the walls forming the water containment W be required, or if one or more specimens of the marine life 30 need special medical or other attention, means must be provided to conveniently hold the aquatic animal(s) in an alternate location, with minimal disruption. Accordingly, a holding tank 42 is provided in the level 5. Such tank occupies the space of one or more family units F and includes closure means such as a displaceable door or gate 43 in the area of the inside wall 14. With this construction, water from the containment will be seen to also flow and substantially fill the holding tank 42 and when it becomes necessary to place any of the marine life therein, the door or gate 43 will be opened and the aquatic life herded therein. If the intent is to isolate one or more specimens of marine life within the holding tank 42, then water 27 from the containment W is allowed to continue to comingle with that within the tank in order to maintain consistent physical and chemical parameters of the water. On the other hand, if the containment W is to be drained, then the door 43 would obviously be sealed, in a water-tight manner. In this regards it will be appreciated that the same mechanical equipment 37 servicing the containment W, will also be utilized to service water as retained in the holding tank 42.

To minimize variations in the temperature and salinity of the water 27 and to provide a stabilized environment for residents between the bounds of the housing structure inside wall 14, a dome-like enclosure or roof 44 is provided and which fully spans the open space between the inside wall.

I claim:
1. An on-shore structural installation for the cohabitation of humans and marine life comprising;
   a housing assembly including a plurality of vertically or horizontally stacked levels having a continuous inside wall and outside wall,
   each said level provided with a plurality of adjacently connected individual units at least some of which comprise independent living quarters,
   one or more said levels defining lowermost levels and disposed within an excavation below ground level,
   one or more other ones of said levels defining uppermost levels disposed above ground level,
   a plurality of walkways exteriorly of both said housing assembly inside and outside walls each joining adjacent ones of said individual units on a respective said level,
   doors in said housing assembly walls providing communication between said units and said walkways,
   a water containment located juxtaposed said housing assembly inside wall and disposed laterally adjacent at least one of said levels disposed below ground level,
   windows within said housing assembly inside wall permitting occupants within said units in at least one of said levels below ground level to view at their level into water within said water containment,
   access means for movement of humans exteriorly of said housing assembly outside wall and connecting to all said walkways above and below ground level and accessible from ground level,
   access means for movement of humans exteriorly of said housing assembly inside wall and connecting to all said walkways above ground level,
   at least one passage disposed between adjacent ones of said units and extending between said inside and outside walls,
   said access means permitting occupants of the housing assembly to move between all said levels, and said access means permitting occupants to have direct entry into water within said containment.
2. A structural installation for the cohabitation of humans and marine life according to claim 1 including;
   a dome-like roof extending from said housing assembly inside wall and overlaying said water containment.
3. A structural installation for the cohabitation of humans and marine life according to claim 1 wherein;
   at least one said wall of said stacked levels defines a substantially circular configuration in plan.

* * * * *